April 23, 1935.  J. J. WASSER  1,999,011
DISPLAY DEVICE
Filed Aug. 17, 1933    2 Sheets-Sheet 1
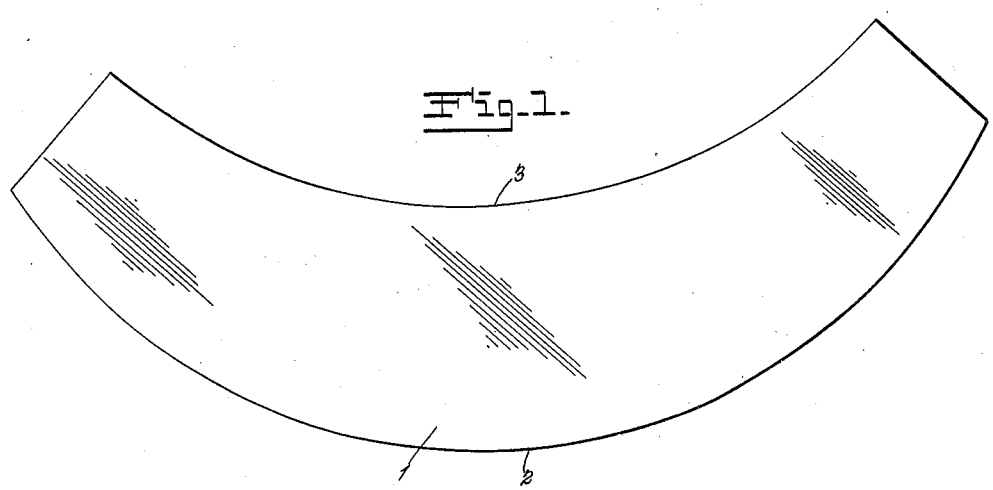
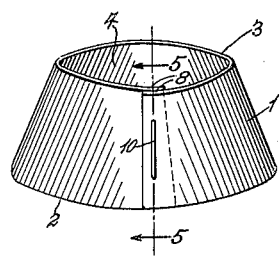
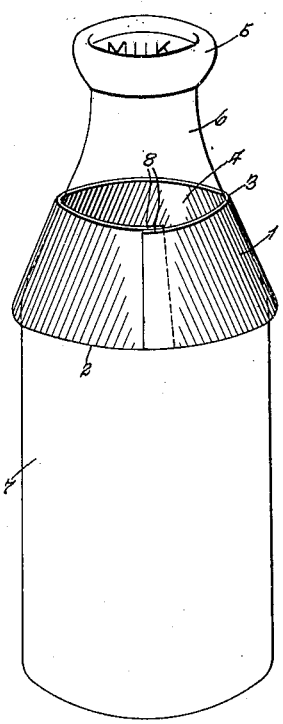
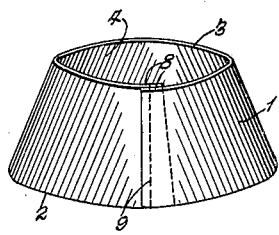
Inventor
Joseph J. Wasser
By Rippey & Kingsland
His Attorneys April 23, 1935.　　　J. J. WASSER　　　1,999,011
DISPLAY DEVICE
Filed Aug. 17, 1933　　　2 Sheets-Sheet 2
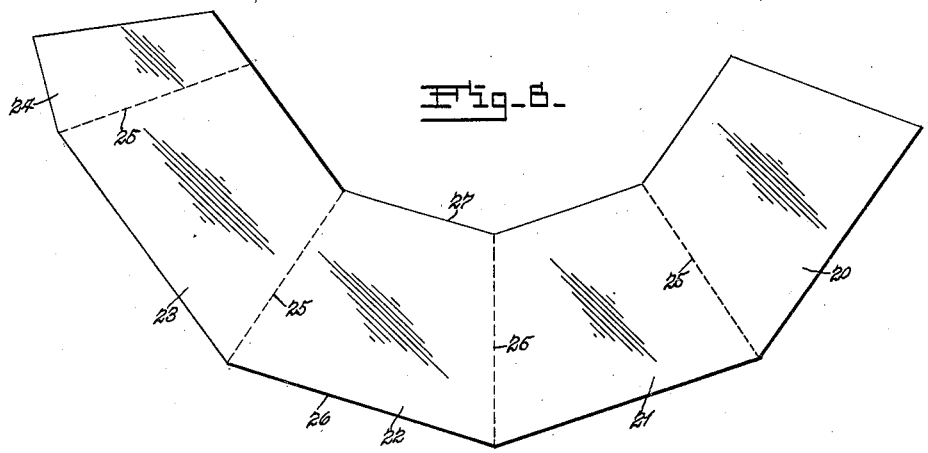
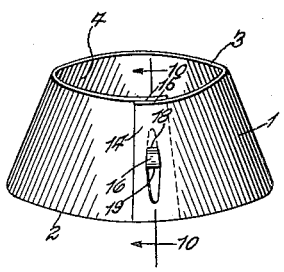
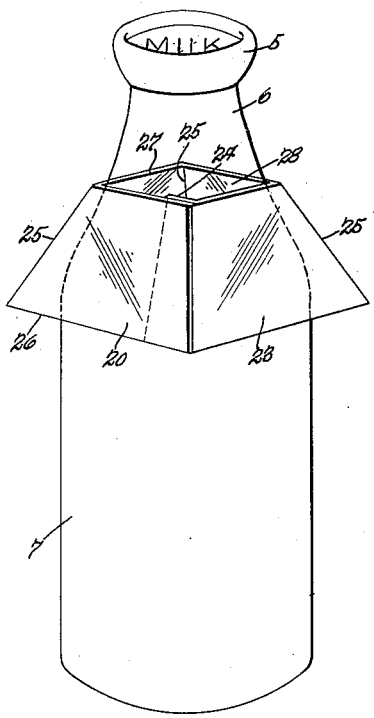
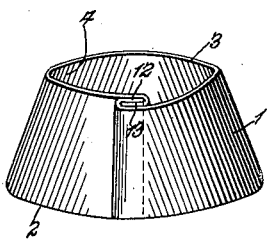
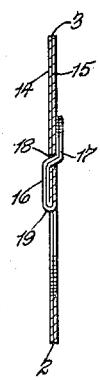
Inventor
Joseph J. Wasser
by Rippey & Kingsland
His Attorneys.

Patented Apr. 23, 1935

1,999,011

UNITED STATES PATENT OFFICE 1,999,011

DISPLAY DEVICE

Joseph J. Wasser, St. Louis, Mo., assignor to Pevely Dairy Company, St. Louis, Mo., a corporation of Missouri Application August 17, 1933, Serial No. 685,594

3 Claims. (Cl. 40—4)

This invention relates to display devices, and has special reference to a display device composed of a strip of pliable material, such as paper, and adapted to be shaped into truncated form with a lower diameter approximately equal to the diameter of the body of a commercial milk bottle and an upper diameter slightly greater than the diameter of an intermediate portion of the tapered neck of the bottle.

This application is a continuation in part of my copending application, Serial No. 332,258, filed January 14, 1929.

It is a familiar fact, and a condition which is herein emphasized, that the present type of commercial milk bottle includes an approximately cylindrical body having an upwardly tapered neck merging and uniting entirely with a circumferential flange or bead surrounding the open end of the bottle neck. This bead is of larger diameter than the immediately adjacent portion of the bottle neck but is of less diameter than the lower tapered portion of the neck of the bottle.

Dairy products that are now sold and delivered by dairy companies to individual customers have become numerous and diversified to such an extent that the milk and cream delivered in these milk bottles constitute only a small percentage of the dairy products sold and distributed by the dairy companies, although the milk and cream constitute a staple product that is delivered daily to a very large number of individual customers. The milk and cream are delivered in these milk bottles usually at the doors of individual customers and the problem of advertising the various and diversified additional products has become and has long been a problem of the dairy industry. It is desirable to advertise the various and diversified dairy products without subjecting the industry to burdensome or prohibitive expense, as by communications sent through the mails to the individual customers.

An object of the present invention is to provide a display device composed of a strip of paper, or other appropriate pliable material, having its ends attached in a manner to hold the strip in upwardly tapered truncated form in a predetermined size in relationship to the body and the neck of the bottle and the flange at the upper end of the neck, so that the neck of the bottle may be extended through the display device to a position in which the lower edge of the display device is approximately at the union of the neck with the body of the bottle and the upper end of the display device is around an intermediate portion of the bottle neck. The display devices are preferably made of paper for reasons of economy and must be constructed and arranged so that they can be sold and distributed to dealers in flat condition and may be assembled with the ends of the display devices attached in a relationship in which the ends are approximately immovable relatively so as to provide approximately conical display devices constructed in proportion and size, so that the display devices may be passed downwardly over the flange at the end of the bottle neck without tearing the paper, and then seated upon the tapered portion of the bottle neck. A preferred construction comprises a strip of paper or the like provided with overlapping ends adapted to be attached in relatively immovable relationship and thereby hold the strip in the conical form indicated, so that the flange on the upper end of the bottle may be passed through the smaller end of the display device without tearing the paper.

When placed upon the bottle neck in the manner indicated, the display device leaves the bottle neck flange and the adjacent portion of the bottle neck exposed, so that the upper end of the bottle neck or the body portion of the bottle may be easily grasped by the hand without engaging the display device.

Another object of the invention is to provide a display device composed of a strip of pliable material having its upper and lower edges forming less than semicircles and with the upper edge of less length than the lower edge, said strip being shaped in tapered form with its ends overlapped, and means fastening together said overlapping ends in relatively fixed relationship to hold the strip in said tapered form and in a size and relationship so that the device can be placed upon the shoulder portion of a milk bottle without tearing or damaging the device when the flange of the milk bottle is extended therethrough.

Another object of the invention is to provide an improved display device embodying the construction and arrangement and adaptability above indicated and possessing other advantages hereinafter disclosed, reference now being made to the annexed drawings, in which—

Fig. 1 is a view showing one form of a strip for use in making my improved display device before said strip is shaped for attachment to a milk bottle.

Fig. 2 is a perspective view showing a completed display device mounted on the neck of a milk bottle.

Fig. 3 is a perspective view of a display device having its ends attached by stitches.

Fig. 4 is a perspective view of a display device in which the ends of the strip forming the display device are held in approximately relatively immovable relationship by a fastening member.

Fig. 5 is a sectional view on the line 5—5 of Fig. 4.

Fig. 6 is a plan view of another form of strip for forming a tapered display device.

Fig. 7 is a perspective view showing a display device formed by the strip shown in Fig. 6 applied to a milk bottle.

Fig. 8 is a perspective view of a display device of tapered form having its ends interlocked in relatively immovable relationship.

Fig. 9 is a perspective view of a display device having its ends attached by interlocking tongues which hold the ends of the strip approximately immovable with respect to each other.

Fig. 10 is an enlarged cross sectional view on the line 10—10 of Fig. 9.

The device shown in Figs. 1 to 5, inclusive, comprises a strip 1 of flexible and pliable material, such as paper, and having a lower edge 2 and an upper edge 3 of less length than the lower edge and both of said edges less than semicircles. It will be noted, by inspecting Fig. 1, that the upper edge 3 of the strip of flexible and pliable material is formed eccentrically with respect to its edge 2 and on a radius of equal length. This results in the intermediate portion of the strip being of greater width than the end portions. When the end portions are immovably connected together, a truncated cone formation is provided with the upper and lower edges of the cone occupying planes which are angularly arranged with respect to each other. Due to the intermediate portion of the strip being of greater width than the end portions, the intermediate portion of the upper edge of the strip, when the strip is shaped to form a cone, will more closely approach the apex of the cone than will the portion of the upper edge of the cone which is formed by the overlapped ends of the strip. Expressed in a different way, the portion of the upper edge of the cone formed by the widest portion of the strip, will more closely approach the axis of the cone which is normal to the plane occupied by the lower edge of the cone.

As stated above, the strip is made of proper size so that the smaller end of the cone will just pass over the flanged upper end of the bottle. When the cone is applied to a bottle, its upper edge is concentrically arranged with respect to the bottle axis to obtain the benefit of the full diameter of this smaller opening. When the cone settles onto the enlarged shoulder portion of the bottle, the cone will rest evenly on the bottle, with the lower edge of the cone concentric with the axis of the bottle, or with the plane occupied by the lower edge of the cone normal to the axis of the bottle. This shifting of the cone relative to the bottle axis will render the smaller, upper opening eccentric with respect to the bottle axis and will cause a portion of the upper edge of the cone, formed by the intermediate portion of the strip, to contact with the neck portion of the bottle and to underlie the flange at the upper end of the bottle. This contacting with the bottle neck will tend to prevent rocking of the cone on the bottle. This same portion of the upper edge of the cone, due to its underlying the flange, will tend to cause the said portion of the edge to catch on the flange to prevent the cone from falling off of the bottle should the latter be inverted.

These strips may be made in different lengths for use in forming display devices of different sizes to be applied to milk bottles of different sizes. This is to say that for quart bottles the display devices are made of one size, and are made of another size for half pint bottles and may be made of intermediate sizes for the intermediate sizes of bottles. The ends of the strip 1 are constructed so that they may be overlapped to form a conical display device having at its upper end an opening 4 of slightly greater diameter than the diameter of the flange 5 at the upper end of the tapered bottle neck 6 extending upwardly from the cylindrical body 7 of the bottle. My present invention comprises means for attaching the ends of the blanks in relatively fixed relationship without slitting and thereby weakening the strip. The conical display devices in their finished form are of such size that when applied to the bottles for which they are intended the lower edge 2 is approximately at the upper end of the cylindrical body 7 of the bottle and at the beginning of the neck 6 while the upper edge 3 encircles an intermediate portion of the neck 6 and has a diameter at least as great as the diameter of the flange 5. Thus, the display device fits snugly on the neck of the bottle.

The display device illustrated in Fig. 2 has the ends 8 of the strip overlapped and attached together by glue, or other adhesive substance, so as to hold the ends relatively immovable. These ends of the display device may be overlapped and attached together after the strip has been wrapped around the bottle neck, or said ends may be overlapped and attached together in fixed relationship to form the display device before the display device is placed on the bottle, as may be preferred.

The display device shown in Fig. 3 is composed of a strip 1 rolled into tapered or conical form with its ends 8 overlapping and attached together in relatively fixed relationship by a row of stitches 9 running transversely of the ends 8. The stitches 9 are applied before the device is placed on the milk bottle, leaving the opening 8 at the smaller end of the device of sufficient diameter to permit the flange 5 of the bottle to pass therethrough and the display device to be seated upon the tapered shoulder of the bottle neck with the lower edge 3 approximately at the upper end of the cylindrical body 7.

The display device shown in Figs. 4 and 5 is composed of a strip 1 in conical form having its ends 8 overlapping and secured together in relatively fixed relationship by a metallic fastener 10. The metallic fastener 10 may be a wire staple having its ends extending through the overlapping end portions 8 of the strip 1 and the extremities 11 clamped against one of the overlapping ends. This staple 10 has its two arms toward the lower edge 2 and the upper edge 3, respectively, of the strip and thus prevents any pivotal action or other relative movement of the intermediate portion of the ends of the strip.

The display device illustrated in Fig. 8 is composed of a flexible and pliable strip 1 having one end 12 folded inwardly and the opposite end 13 folded outwardly and interlocked. The interlock is obtained by extending the end 12 between the body of the strip and the folded end 13 and extending the end 13 between the folded end 12 and the body of the strip. The ends may be attached in this relationship by glue, or other adhesive substance or fastening means, in order to hold the ends in relatively fixed relationship and to leave the opening 4 of sufficient diameter to permit the flange 5 to pass therethrough.

The display device shown in Figs. 9 and 10 is composed of a strip 1 having its ends 14 and 15 overlapped. The overlapped ends are cut to form a tongue 16 integral with the end 14 and a duplicate tongue 17 integral with the end 15 and these tongues are superimposed one against the other and folded and extended through registering slits 18 in the overlapping ends 14 and 15 and thence against the inner surface of the overlapping end 15. Thus, the tongues are engaged with each other with the overlapping ends 14 and 15 at spaced points, one such point being at the fold 19 and the other at the slit 18. This device holds the overlapping ends in fixed relationship in which the opening 4 is of sufficient diameter to permit the flange 5 to be passed therethrough without tearing the strip 1 or effecting relative movement of the overlapping ends.

The device shown in Figs. 6 and 7 comprises a strip of flexible and pliable material including integrally united sections 20, 21, 22, 23 and 24 defined from each other by fold lines 25. The lower edge 26 of this strip is longer than the upper edge 27 and the lines 25 converge upwardly from the lower edge 26 to the upper edge 27. A display device is formed by means of this strip by folding the strip along the lines 25 and placing the section 24 against one surface of the section 20 and attaching the same thereto by appropriate fastening means, such as glue or other fastening devices. This display device is approximately of pyramidal form having an opening 28 at its smaller end of sufficient size to permit the flange 5 of the bottle to be passed therethrough without effecting relative movement of the parts 20 and 24 and without tearing or damaging the display device.

It must now be apparent that this improved display device may be constructed of thin pliable paper, or other material, and that the ends of the display device are securely attached in relatively immovable relationship without weakening the material. Any appropriate advertisements or displays may be formed or displayed on the outer surfaces of these conical display devices. The smaller end of each of these display devices is of sufficient size to permit the end and upper portion of the neck of the bottle to pass therethrough but will not permit passage of the larger portion of the bottle neck. Therefore, the device will be supported upon and about the neck of the bottle and constitutes an inexpensive and highly desirable device that may be manufactured and sold at permissible cost and applied without difficulty. The construction and arrangement of the fastening means for holding the ends of the strip in relatively fixed relationship may be varied otherwise than as specifically described and within the scope of equivalent limits without departure from the nature and principle of the invention.

I claim:—

1. A display device for application to a bottle having a cylindrical body portion, a tapered neck, and an enlarged top flange, said device comprising an arcuate piece of pliable material having its upper and lower edges curved on radii of the same length adapted to be formed into a truncated cone by overlapping the ends and having a lower diameter approximately equal to the body portion of the bottle and an upper diameter approximately equal to the top flange of the bottle, the height of the device varying in opposite directions from diametrically opposite points to cause different portions of the upper edge of the device to be located at different distances from the longitudinal axis of the bottle when the lower edge of the device is concentric with the axis of the bottle, and means for immovably connecting the overlapped ends of the body portion.

2. A display device for application to a bottle having a cylindrical bottom portion, a tapered neck, and an enlarged top flange, said device comprising an arcuate piece of pliable material adapted to be formed into a truncated cone by overlapping the ends and having a lower diameter approximately equal to the body portion of the bottle and an upper diameter approximately equal to the top flange of the bottle, the wall of said cone being so shaped that the upper and lower edges occupy planes which are angularly arranged with respect to each other, and means for immovably connecting the overlapping ends of the piece of material.

3. A display device for application to a bottle having a cylindrical body portion, a tapered neck, and an enlarged top flange, said device comprising an arcuate piece of pliable material adapted to be formed into a truncated cone by overlapping the ends and having a lower diameter approximately equal to the body portion of the bottle and an upper diameter approximately equal to the top flange of the bottle, the wall of the cone being so shaped that when the lower edge of the device is concentric with the longitudinal axis of the bottle portions the upper edge of the device will be located different distances from said axis, and means for immovably connecting the overlapping ends of the piece of material.

JOSEPH J. WASSER.